United States Patent [19]
Griffith et al.

[11] Patent Number: 5,270,092
[45] Date of Patent: Dec. 14, 1993

[54] GAS FILLED PANEL INSULATION

[75] Inventors: Brent T. Griffith, Berkeley; Dariush K. Arasteh, Oakland; Stephen E. Selkowitz, Piedmont, all of Calif.

[73] Assignee: The Regents, University of California, Oakland, Calif.

[21] Appl. No.: 742,438

[22] Filed: Aug. 8, 1991

[51] Int. Cl.⁵ .............................................. B32B 1/04
[52] U.S. Cl. ........................................ 428/69; 52/806; 52/807; 52/808; 52/809; 428/72; 428/73; 428/76; 428/118; 428/156; 428/166; 428/178; 428/188; 428/192; 428/516; 428/518; 428/520; 428/521
[58] Field of Search ............. 428/69, 72, 73, 76, 428/516, 518, 520, 521, 166, 156, 188, 118, 178, 192; 52/809, 806, 807, 808

[56] References Cited
U.S. PATENT DOCUMENTS

| | | | |
|---|---|---|---|
| 4,262,045 | 4/1981 | Cheng | 428/69 |
| 4,284,674 | 8/1981 | Sheptak | 428/69 |
| 4,618,517 | 10/1986 | Simko | 428/69 |
| 4,636,416 | 1/1987 | Kratel | 428/69 |
| 4,669,632 | 3/1987 | Kawasaki | 428/69 |

FOREIGN PATENT DOCUMENTS 2750819 5/1979 Fed. Rep. of Germany ........ 428/69

*Primary Examiner*—Ellis P. Robinson
*Assistant Examiner*—Nasser Ahmad
*Attorney, Agent, or Firm*—Paul R. Martin; Kathleen S. Moss; Pepi Ross

[57] ABSTRACT

A structural or flexible highly insulative panel which may be translucent, is formed from multi-layer polymeric material in the form of an envelope surrounding a baffle. The baffle is designed so as to minimize heat transfer across the panel, by using material which forms substantially closed spaces to suppress convection of the low conductivity gas fill. At least a portion of the baffle carries a low emissivity surface for suppression of infrared radiation.

25 Claims, 6 Drawing Sheets

GAS FILLED PANEL INSULATION

This invention was made with Government support under Contract No. DE-AC03-76SF00098 between the U.S. Department of Energy and the University of California for the operation of Lawrence Berkeley laboratory. The Government has certain rights in this invention.

FIELD OF THE INVENTION

This invention relates to thermal insulating panels useful for placement in building walls, refrigerators and the like, and particularly to a panel utilizing a core/envelope structure for minimizing radiative, convective and conductive heat transfer across the panel.

BACKGROUND OF THE INVENTION

Means by which walls and the like may be insulated are much discussed in the literature, and various ways of minimizing conductive, convective and radiative heat transfer are described. Fundamentally, all approaches use certain basic understandings of heat transfer. These understandings are applied to select and combine materials in a way which provides the highest possible insulating value under a given set of conditions. There is always a trade-off, however, with respect to the cost of the materials used, and the effort necessary to manufacture such materials into a truly effective insulator from both an insulating and cost of manufacture standpoint.

As the cost of energy increases, even relatively small quantitative improvements in the total performance of a particular insulating scheme can provide significant savings for the energy consumer. Given the same insulating value, the relative value of an improved insulating scheme must take into account the thickness of the material, the cost of the materials used, the cost to assemble those materials in the proper form, the cost of transporting such insulation to the place of installation, and the cost to install. Generally, insulations with good thermal performance per unit thickness are more desirable. Bulky and or heavy insulation schemes are disadvantageous, even if good insulating value is provided. Also disadvantageous are materials which have negative environmental impacts, such as chlorofluorocarbon (CFC) blown foams, and potential health hazards, such as airborne fiberglass.

Other characteristics are desirable for certain applications. Daylighting schemes employ natural light transmitted through a building envelope. For these applications it is useful to have an insulator that is partially transparent to the visible spectrum but at the same time providing good resistance to heat flow.

Retrofit applications typically have limited space available and/or difficult access to these spaces. For such cases it is especially desirable to have an insulator that is high performance per unit thickness to attain overall performance comparable to current accepted levels of insulation for new construction. In addition, the insulator must be easily installed and functional in limited access spaces, for example by inserting collapsed and expanding to fill a mostly closed stud wall cavity.

Insulation performance is often measured by use of "R" values, where R is a thermal resistivity, and higher R-values indicate better insulating performance. R-value/in. is used to compare the thermal performance of different insulating materials. For example, fiberglass has an R-value/in. of about 3.2 hr-ft$^2$-F/BTU, while styrene foam has an R-value/in. of about 5 hr-ft$^2$-F/BTU. Chlorofluorocarbon (CFC) blown polyurethane foam has an initial R-value/in. of about 7.2 hr-ft$^2$-F/BTU, which slowly degrades as CFCs diffuse out of the foam cells.

The primary function of a thermal insulation is to reduce heat transfer. There are three forms of heat transfer; conduction, convection, and radiation. Conduction involves heat flow through the material in the form of direct interaction of atoms and molecules. Convection involves conduction combined with mass transfer of fluids (gases) where heat flow is enhanced by the relative movement of fluids at different temperatures. Radiation involves direct net energy transfer between surfaces (at different temperatures) in the form of long wave infrared electro-magnetic radiation (light) as surfaces emit and absorb this radiation. The amount of absorption and emission of radiation depends on the surface emissivity which is a material property. Low emissivity surfaces emit and absorb much less radiation than high emissivity surfaces.

Insulations attempt to reduce these three components in different ways. Fiberglass insulation utilizes fairly low conductivity fibers in a stack or batt with air amongst the fibers. The fibers are oriented, somewhat randomly, such that they do not line up in the direction across the batt thereby reducing solid conduction. Convective movement of the air amongst the fibers is reduced by the presence of large numbers of fibers. Radiation is somewhat scattered as it passes through the fibers which reduces radiative heat transfer. Closed cell foam structures, however, are comprised of a polymer matrix with many small, mostly closed cavities. Conduction is reduced by using low conductivity materials and comprising most of the volume with air (or remains of the blowing agent). Convection is effectively eliminated by trapping the gases in small closed cells. Radiation is low because the cells are typically very small and there is little temperature difference between cavity walls and hence low driving force for radiative heat transfer.

Conduction can only be eliminated by removing all the mass, as in a vacuum, which is difficult to produce and maintain. Conventional insulations utilize gas for most of the volume because gases are much lower conductivity than solids or liquids. The ideal limiting case for gaseous insulations is when convection and radiation are completely suppressed and the only form of heat transfer is through the gas. Still gas conductivities in terms of R-value/in. for some gases at two different temperatures, are for example:

|         | 273 K. (32 F.) | 300 K. (80 F.) |
|---------|----------------|----------------|
| Air     | 6.0            | 5.5            |
| Argon   | 8.8            | 8.1            |
| Krypton | 16.6           | 15.3           |

These values constitute maximum performance potentials for gaseous based insulations. It is known that higher performance insulation is obtainable by using gases of lower conductivity than air. Current insulations are incapable of utilizing harmless inert gases such as argon and krypton. This is a problem for existing insulation schemes because they are limited to relatively low thermal performance per unit thickness. As energy efficiency becomes more important it is desirable to use insulations of better performance per unit thickness, rather than thicker layers of existing insulations.

The invention herein minimizes the three forms of heat transfer by different approaches than existing insulations. Conduction is minimized by not only comprising the panel mostly of gas but the designs also allow for the use of any type of gas desired. Conduction can then be reduced by the use of gases with lower conductivity than air. Convection is suppressed by the use of continuous solid layers in the form of films or sheets in an assembly that creates cavities. The cavities are sized and arranged such that convective heat transfer is effectively eliminated. Radiative heat transfer is reduced by the use of low emissivity surfaces on the layers forming the cavities. The combination of convection and radiation suppression is intended to achieve performance very close to the ideal still gas conductivities.

It is thus an object of the present invention to provide optimal baffle forms that are practical to produce, and perform very close to the ideal still gas by 1) suppressing convection/mass transfer effects by utilizing continuous solid layers in the form of films or sheets in an assembly and 2) suppressing radiative heat transfer by the use of low emissivity surface cavities. Baffle forms have the effect of being a useful insulation medium that can be effectively filled with a low conductivity gas and maintained as such with a gas barrier envelope surrounding the baffle forms thus forming a panel.

It is a further object of the present invention to provide an insulating panel having as much or more insulating value per unit thickness as those schemes now commonly in use, is capable of making excellent use of low conductivity gases, in a form which is simple to manufacture, is extremely lightweight and is capable of being produced in collapsed form to minimize the cost of transportation. The insulation panel must be compatible with current construction methods for new walls and ceilings, in manufactured housing and for site built structures. The insulation panel must also be capable of being used in many retrofit applications where other forms of insulation are either impossible or too low performance.

It is another object of the invention to provide an insulation panel which can enable a significant increase in overall wall thermal performance without an increase in wall thickness or a significant change in construction technique.

It is another object of the invention to provide effective insulation panels and techniques for a broad range of insulation applications within the temperature ranges found in buildings and the appliances associated with them.

It is another object of the invention to provide an effective insulator that can be produced with available materials and processing technologies.

It is another object of the invention to provide an insulation panel that is harmless to handle, has an appealing appearance, and is not otherwise messy or unattractive.

It is another object of the invention to provide a stiff insulating panel which may be retrofit or built into cold storage container walls, such as refrigerators and freezers which is long lived, high performance, which avoids the use of CFCs, and which can be used in composite with non-CFC foams.

It is another object of the invention to provide an insulation technique which can be incorporated into durable goods, such as entire refrigerator/freezer components, made by employing baffle forms of the invention in structural/barrier polymer encasements.

It is another object of the invention to produce an insulating material which can be formed in significant part from recycled, and recyclable materials.

It is a further object of the invention to produce a panel which is at least partially transparent to visible light, but which is nevertheless highly insulating and retains all the insulating characteristics of opaque panels.

SUMMARY OF THE INVENTION

To achieve the foregoing objects, the present invention provides a simple to manufacture, lightweight, highly effective insulating panel. The panel is easily adapted to such diverse uses as building insulation and daylighting devices (since it may be translucent to visible light), while nevertheless avoiding the use of undesirable materials. The panel may be formed from recycled and/or recyclable materials and is capable of performing 90–95% as well as the ideal still gas but has the advantage that any gas can be filled inside.

In its most basic form the panel of the invention comprises a gas filled envelope which surrounds a shaped core material. The core (or "baffle") is shaped to minimize heat transfer across the envelope due to convection, conduction and radiation by (1) utilizing a very low conductivity material in the form of solid layers or films, (2) forming the low conductivity core material into long solid conduction paths such that relevant gas convection and conduction paths across the envelope are minimized and (3) providing a layer on at least one surface of the core material which has an infrared emissivity of less than 0.3. The core (or baffle) is constructed such that it is either supportive, self supporting, or self locating such that no additional elements, such as spacers or framing, are required and in such a way that it can be largely assembled from "roll stock" material.

Preferably the envelope is filled with gas or gas mixtures which are known good insulators, such as argon, krypton, xenon, carbon dioxide and sulfur hexafluoride, however, the envelope and core designs provide surprisingly good insulating performance even when air is used.

The panels may be made in flexible (and inflatable) form for ease of handling and use in retrofitting or may be made using stronger core materials shaped to provide some structural support where such is necessary or desirable. The inflatable form of the panel is designed to minimize contraction of the baffle along the length as the panel is inflated so that poor insulation performance spaces are not created at the periphery and faces of the envelope.

In a further embodiment of the invention, in either its structural or flexible forms, the panel envelope and core material are at least partially transparent to visible light while at the same time employing baffle material with an infrared emissivity of 0.3 or less on some surfaces.

BRIEF DESCRIPTION OF THE DRAWINGS

The invention will be better understood by reference to the appended drawings, of which.

DESCRIPTION OF INVENTION

General Characteristics and Applications

Figure 1:
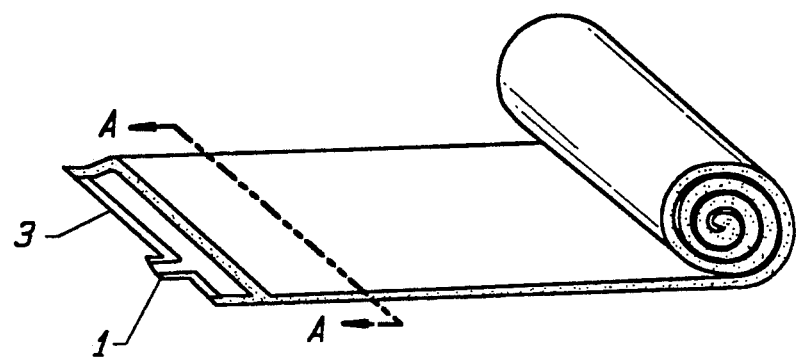
FIG. 1 is a perspective view of a partially unrolled length of an inflatable flexible insulation panel embodiment of the invention.

The invention will be described by reference to the figures.

The invention consists of utilizing a baffle form with a gas amongst the structure for (largely) one dimensional heat flow resistance. A barrier envelope is used to contain the desired gas, if different than air, within a baffle. A baffle is an improvement over current types of insulation that employ fibers or cell/foam structures because it achieves as good or better performance relative to the ideal still gas conductivity, makes more efficient use of material, and can be filled with any desired gas. The baffle elements consist of continuous thin layers of material which do not allow gas to pass through the plane of the layers, whereas fibrous insulations do allow gas to transfer through, only at a reduced rate. This approach offers significant performance increases by maintaining gases in a given location within the panel and employing cavities small enough to suppress convection, thereby maintaining a steeper temperature gradient and hence better thermal performance. Closed cell foam structures also restrict gas movement as such, however it is not possible to create foam cavities filled with harmless, low conductivity gases such as argon and krypton and it is not practical to gas fill them. Open celled foams could be gas filled, however they do not do as well at suppressing convection and hence do not perform as well. Low emissivity surfaces enable a larger temperature difference to be maintained from one cavity wall to another thereby allowing larger cavities without a decrease in thermal performance due to radiative heat transfer. By utilizing low emissivity surfaces, fewer layers can be used and thus less material, making for the most efficient use of material components. The baffles of this invention do not require any additional frame or spacer elements to locate or support the layers which avoids complication of construction, thermal bridges and non-uniform performance. The baffle materials are arranged such that a self supporting, supportive or self locating structure is produced. This results in baffles which break up gas cavities within the plane of insulation and further increases performance and uniformity. The baffles and baffle/envelope panels discussed herein offer many advantages over previous insulations in terms of; high performance per unit thickness, uniform performance, manufacturability, transportation, storage, ease of handling, environmental harmlessness, weight, and cosmetic appeal.

There are two important embodiments of the invention which are the same in concept but differ as to their applications. In one embodiment, the panel of the invention will be formed in a manner and with materials which are able to withstand a significant amount of stress or pressure. These panels, referred to herein as "structural" panels, are useful for insulating applications where no external structure is available to encase the panel and the insulation must help provide structure. These panels are also useful where they may be subjected to rough conditions, such as in handling, by exposure to the environment or pressure and temperature conditions involved with foaming of cavities. The structural embodiments of the invention allow the user to be more confident that the panel will keep its shape for many years, and will be less subject to loss of insulating gas.

An important application for the invention is in refrigerator/freezer (R/F) walls and doors. In general, the immediate use of structural panels would be in applications which currently use CFC foams. Most of these applications rely on the foams for structural strength, thus the use of insulating panels must account for this. There are two basic approaches that could use panels for these applications.

The first approach envisions that modular structural, high performance panels would be used in composite with non-CFC blown foams to yield an insulated wall that has net thermal performance as good or better than could be obtained with the CFC foams currently used. This use is advantageous because it is a "drop in" approach which would not require that manufacturing methods be significantly changed. Basically a conveniently sized tough panel would be used to boost thermal performance of a non-CFC foam insulated wall. Stiff honeycomb baffles with alternating orientation (FIG. 10) used inside of a rigid envelope (FIG. 7) are the preferred embodiment for this application.

A second application of structural panels is a more long range approach and hence very important. Complete redesign of refrigerators and building systems could incorporate the approach and baffle designs of the panels of the invention to create highly insulating structural components. For example, new plastics manufacturing methods could be used to make refrigerator/freezer door panels out of engineering plastics that incorporate gas barriers. The main interior and exterior door panels would then constitute the gas barrier envelope of a panel which could then be completed with a structural baffle for added support and good thermal performance. Basically this would be a structural panel with the envelope faces shaped into the form and function of a refrigerator/freezer door. This coupling of the gas-filled panel approach and new plastic processing of durable goods could eliminate the need for all foams and provide very high thermal performance goods of all types. The envelope material would be both a high performance gas barrier and a strong thermoset or thermoplastic plastic that is designed to be able to carry and distribute most of the loads. Parts could be produced for example by co-injection molding, blow molding, profile coextrusion or thermoforming of coextruded sheet. The panel baffle would contribute to the structural strength of the panel but would not necessarily be the primary structural component. Plastic structural building materials and components such as whole wall panels could be produced with exceptional thermal properties using this approach. Many other applications could be filled with the approach used in structural baffles and panels, for example window systems using this approach to separate the planes of glass for insulated glazings. Details of structural panel embodiments are provided below.

The second important embodiment of the invention also provides very good insulation properties over extended periods, but is extremely useful in situations where a flexible panel is desired. The flexible panel can be transported and installed in an uninflated state to minimize volume and subsequently inflated with an insulating gas. This embodiment will find applications in new building construction, as well as retrofitting, for wall and ceiling insulation in buildings, and for the replacement of CFC foams and the like in the walls of cold storage rooms, freezers and refrigerators where designs do not require that the insulation add structural strength. The flexible panels can readily be used in most applications where fiberglass batt insulation is currently used.

Detailed Description of Flexible Embodiments

The elements of the flexible embodiment of the invention are set forth in FIGS. 1-6. Referring to FIG. 1, a panel is shown uninflated and in a partially rolled-up form. Panels of this type can be made of any specified length, width, and thickness and thus can be tailored to fit between supports on a wall, so as to fill the desired space to be insulated as completely as possible.

At one end of the rolled panel is a valve or tube 1 which is used, for example at a building job site, for inflation of the panels. Once the panel is filled, the tube opening can be sealed.

Figure 12:
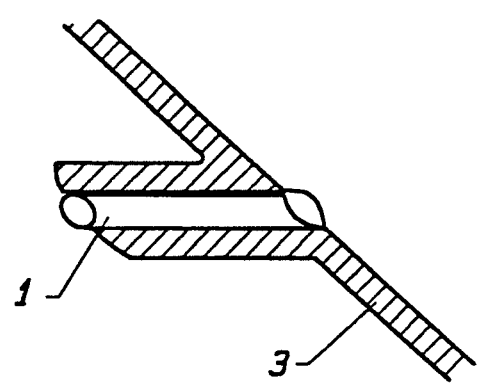
FIGS. 12-14 show a valve and filling nozzle which can be used to fill the panel.

The panel of FIG. 1 has sealed edges 3 around its sides (see also FIG. 12). These edges may be used to mount the panel, once inflated, on a wall by using staples or nails.

Figure 2:
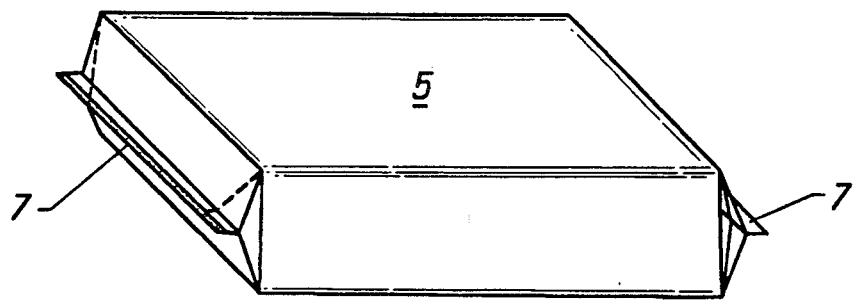
FIG. 2 is a perspective view of an inflated and sealed panel using flexible envelope material.
Figure 4A:
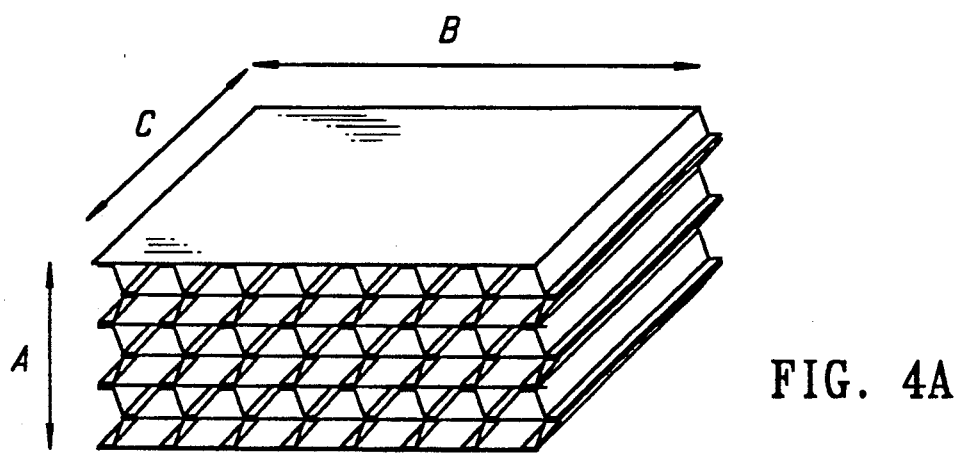
FIG. 4A is a perspective view of a second collapsible embodiment of the core material of the invention, shown in expanded form.
Figure 4B:
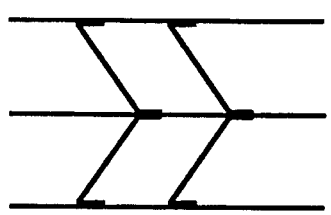
FIGS. 4B-4E are side views showing various ways in which a collapsible baffle of the type shown in FIG. 4A may be constructed.
Figure 4C:
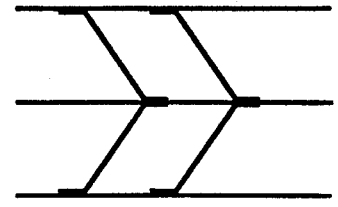
Figure 4D:
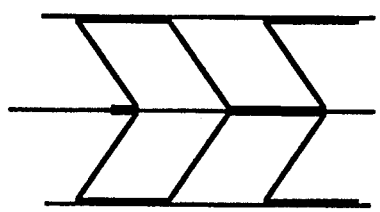
Figure 4E:
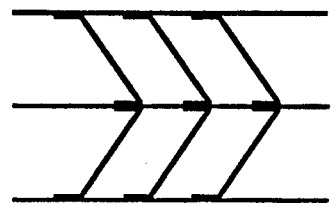
Figure 5:
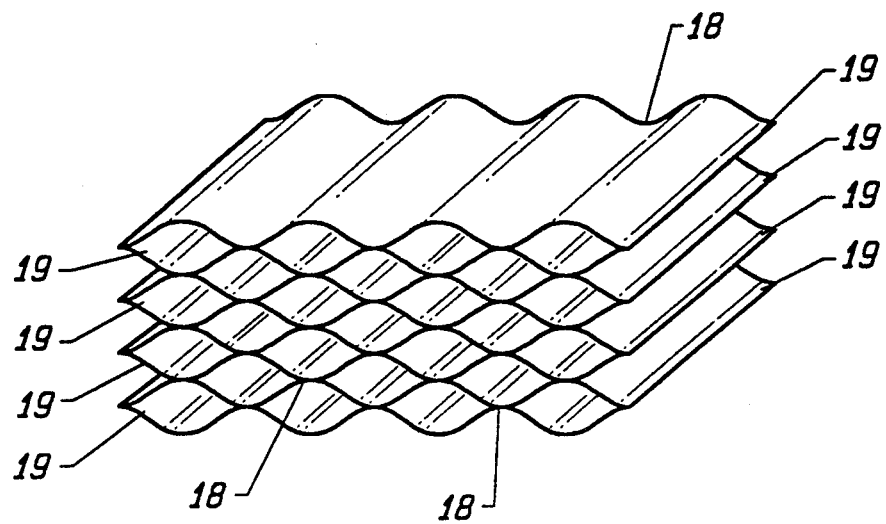
FIG. 5 is a perspective view of a collapsible embodiment of the core material of the invention, shown in expanded form.

FIG. 2 shows an envelope 5 made of flexible multi-layer polymeric material which is folded around an expandable baffle, of the type shown in FIGS. 4 and 5. Envelope 5 of FIG. 2 is in the form of a tube which surrounds the internal baffle and then is folded and sealed along edges 7.

Figure 3:
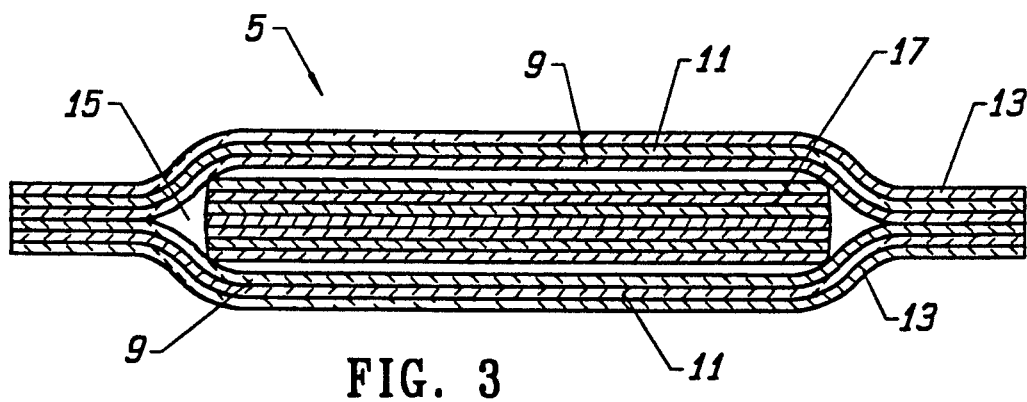
FIG. 3 is a cross-section enlargement taken along line A—A of FIG. 1 in which the specific layers of the envelope used in the preferred embodiment of the collapsible form of the invention are detailed.

FIG. 3 details the multiple layers of material which form the flexible panel. As in FIG. 1, FIG. 3 shows the panel in collapsed form. In the preferred embodiment, envelope 5 comprises three co-joined polymeric layers 9, 11 and 13 surrounding unexpanded baffle or core layers 17. Layer 9 is a hermetically sealable material. Layer 11 is a barrier material. Layer 13 is a durable, puncture resistant layer. Layers 9, 11 and 13 are joined together to comprise one film.

The types of materials used for the flexible envelope must be, as a multi-layer unit, as impervious as possible to the transmission of insulating gasses which will be used, except when air is the desired gas fill. The multi-layer envelope should have oxygen transmissivities of no more than 0.05 cc/100 in$^2$·day·atm, preferably no more than 0.02 cc/100 in$^2$·day·atm, except where the fill gas is air. Gas transmission rates must, in any case, be sufficient to retain the insulating gas within the envelope, and keep air gases outside the envelope, for periods on the order of 20 years or more.

In addition to low gas permeability, the envelope must have low thermal conductivity and very high moisture barrier properties. For the flexible panel embodiment of FIG. 1, the envelope material should be sufficiently flexible so that the panel can be rolled and thereby easily stored and transported.

In all embodiments, the multi-layer envelope material must be sealable such that satisfactory seals can be formed around the panel periphery, for example by heat, radio frequency (RF) welding or ultrasonic welding. Since the panels will be used in building walls and other applications where long life is critical, the materials used must have functional lifetimes on the order of twenty to fifty years.

It is preferred to use multi-layer polymer films consisting of multiple layers of different types of polymers fused or otherwise layered together to form a single film. The films should be flexible and preferably about 2 to 8 mils thick. High gas-barrier resins, durable materials and sealable materials can be co-joined in multiple layer films to produce the high performance materials satisfactory for the invention. As the gas barrier layer, resins such as ethylene vinyl alcohol (EVOH), polyvinylalcohol (PVA) and vinylidene chloride (PVDC) based polymers are preferred. Additionally, materials such as polyester and biaxially oriented ethylene vinyl alcohol can be coated with a vacuum metallized layer to yield excellent gas barrier properties. Also, SiOx (silicon oxide) coatings have excellent barrier properties and are transparent. Metal foil laminates, however, should be avoided due to their relatively high thermal conductivity.

Coextruded films which we have found especially useful include a five layer film approximately four mils thick of nylon/tie/EVOH/tie/LLDPE, where the nylon is used for its durability, the tie layers are used as an adhesive formed of ethylene vinyl acetate (EVA), the EVOH is a good gas barrier, and the linear low density polyethylene is heat sealable. Similar films with more layers of EVOH and tie layer can be used to improve gas impermeability. Further, laminates using metallized polyester coated with PVDC can be used as a barrier layer. Recently developed films use oriented barrier resins such as EVOH and PVA to increase yield and gas barrier performance. These films can be coated with PVDC to provide moisture protection and/or metallized for added gas barrier. Barrier layers of these types can be laminated to a polyethylene for heat sealing on one side, element 9 of FIG. 3, and nylon, polyester, polypropylene or high density polyethylene on the other side, element 13 of FIG. 3, for durability and puncture resistance. Such films are available, for example from Fres-Co Systems of Telford, Pa. which produces a film named VECAT consisting of a PVDC coated oriented PVA barrier layer laminated to oriented polyester and low density polyethylene.

Figure 6:
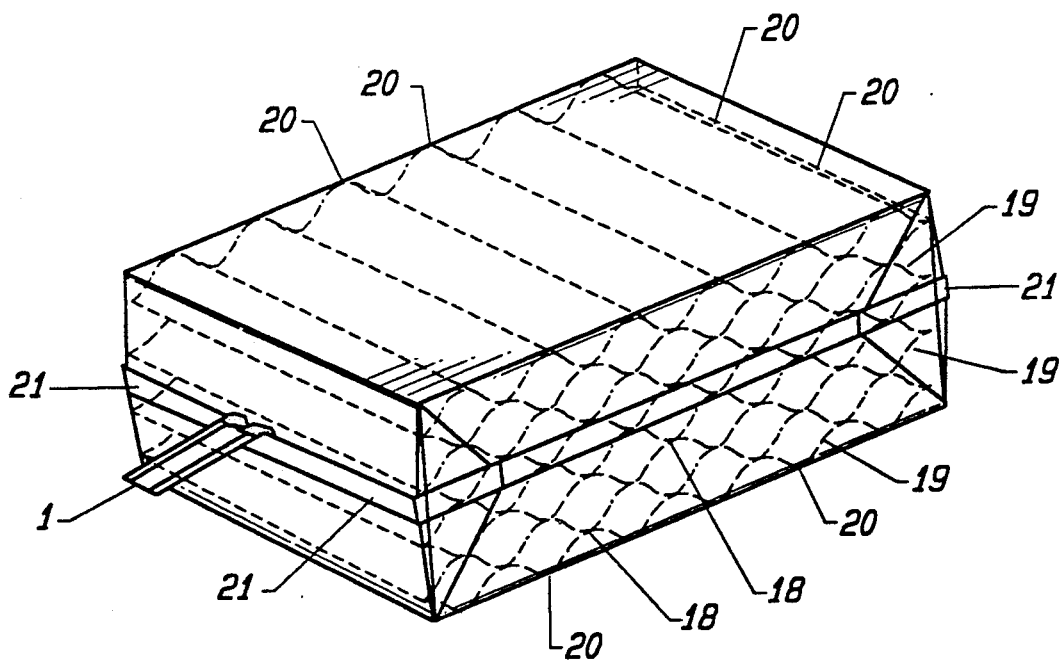
FIG. 6 is a perspective view showing a baffle of FIG. 5 within another type of flexible barrier envelope in its expanded state.

FIGS. 4 and 5 show baffle designs to be used sealed within the envelope type shown in FIGS. 1, 2 and 6. FIG. 5 shows a honeycomb-type expansion baffle. These baffles are primarily useful as a flexible expanding baffle, and thus can be used in a roll-up embodiment as shown in FIG. 1. A baffle is formed from a stack of layers 19. Layers 19 contact each other along evenly spaced lines approximately parallel to one another, and in planes approximately parallel to the faces of the envelope which will enclose the baffle. These lines of contact, element 18 of FIG. 5, alternate, staggered from baffle layer to layer. Lines of contact can be produced by known adhering methods including solvent and water based adhesives, heat sealing, and (preferred) hot melt glues. This baffle embodiment is particularly easy to manufacture as a baffle can be assembled in continuous rolls along the length in a flat multi-layer stack. The baffle takes on the honeycomb form once expanded, i.e. as the outermost layers are pulled apart. This is accomplished by adhering the outer layers to the inside of the envelope. It is desired to adhere the outer barrier layer in such a way that the panel length does not contract upon expansion of the baffle. This is accomplished by expanding the baffle prior to and during the adhering of the baffle to the barrier. This form of baffle is simple to manufacture, is lightweight and, when expanded, provides only indirect conductive paths from one surface of the panel to the other. That is, there are no straight line solid conductive paths across the panel, thereby minimizing conductive heat transfer across the panel.

FIGS. 4A–4E show an additional expandable baffle design. The baffle in FIG. 4 is especially preferred since, unlike the honeycomb design of FIG. 5, it does not contract along its length (direction "B") when it is expanded. Assembly of the baffle of FIG. 4A can be accomplished in different ways, some using more material than others and thereby being costlier, as shown in FIGS. 4B–4E. The form shown in FIG. 4D shows the use of a continuous layer which provides ease of manufacture but uses more material. Known adhesives, heat, RF or ultrasonic sealing may be used to assemble the baffle materials into the desired form.

In order to avoid heat transfer problems at the edges of the panel, it is especially preferred to use a baffle shape which does not contract in any problematic manner relative to the envelope as the baffle/envelope combination is expanded. Thus, while the baffle of FIG. 4 is somewhat more difficult and costly to manufacture than the baffle of FIG. 5, it may be preferred to use that baffle to make the baffle/envelope assembly simpler The material forming the baffles shown in FIGS. 4 and 5 is selected from materials which are easily handled, have low thermal conductivity and can be metallized. Basic baffle materials include polyester, polypropylene, polyvinylchloride and polyethylene. Polymer films should be flexible and preferably less than 2 mils thick. Additionally, non gas permeable thin materials such as papers made out of wood or fiberglass can be used in thickness less than 4 mils. At least some, but not necessarily all of the baffle materials, should have surfaces with low emissivity in the infrared spectrum. For opaque applications the low emissivity baffle surfaces may be vacuum metallized, for example with a layer of aluminum on the order of 200 to 1000 angstroms thick. Metallized coatings as such typically have an emissivity of about 0.04. The metallized coating can be directly applied to the baffle materials or can be applied by lamination of a metallized film to the baffle material. In general, the baffle will be assembled from metallized roll stock material with one (or possibly two) sides completely metallized. The most preferred baffle material for flexible embodiments is biaxially oriented polypropylene (BOPP) film around 0.7 mils thick with a vacuum deposited metallized surface on one side, such as is available from Quantum Performance Films of Streamwood, Ill.

For transparent insulation applications, thin coatings which are partially transparent to the visible and solar spectrum of light and reflective to long wave radiation can be used. The basic baffle materials are the same as for opaque embodiments. Transparent low emissivity coatings are presently used in certain window applications. A typical product useful in the present invention is called "Heat Mirror", from Southwall Technologies of Palo Alto, Calif. However, films from the window industry are costly and higher performance than is necessary (in terms of optical clarity and dimensional stability) for the insulation applications discussed herein. To improve cost effectiveness, less expensive films which have the less demanding characteristics necessary for this invention would be used.

The function of the baffle is, of course, to minimize heat transfer across the panel. To minimize conductive heat transfer, the designs provide for long solid conduction paths relative to panel thickness. So as to minimize convective heat transfer, the gas cavities created by the baffle are sized in such a way that convection is suppressed. The cavity scale of the spacings within the expanded baffle should range from $\frac{1}{8}''$ to $\frac{1}{2}''$, as measured in the direction from one face to the other, i.e. across the panel (direction "A" in FIG. 4). Optimal cavity spacing will vary and is dependent on gas fill type, the temperature differential of the particular application, emissivity and the dimensions of the cavity on the plane insulated, as well as desired performance and relative cost of materials. For baffles of FIGS. 4 and 5 the cavity spacing is adjusted by simply varying the number of layers in the unexpanded baffle. For an end panel that is three inches thick, a typical number of baffle layers is fourteen, or a cavity spacing of 0.21 inches.

The baffle design of the invention minimizes convective heat transfer by suppressing movement of the insulating gas across the panel (from panel face to panel face) as well as within the plane of the panel. For panels oriented in a vertical position such that heat flow (direction "A") is horizontal and direction "B" is vertical, the baffle design should be such that "cell" size in direction "B" should be no more than six inches, and preferably less than 2.5 inches. On the other hand, we have found that providing additional structure to suppress gas movement in the horizontal direction (i.e. across the width of a panel—direction "C" in FIG. 4) provides little additional insulating value. The cavities should be one dimensional in the sense that directions "A" and "B" are restricted but the cavity is free to extend in the third (direction C) dimension. For many baffle forms and installation orientations, directions "B" and "C" are interchangeable. This breaking up of the cell size in the plane of the panel provides further convection suppression which enables a larger cavity scale in direction "A" for all orientations. Equal performance and substantial increases in cavity scale (direction "A") are possible with these baffle forms compared to plane parallel cavities that extend without interruption in the plane of the insulating panel.

Another baffle embodiment consists of utilizing randomly textured layers such that the individual layers are separated in a self supporting manner. This is achieved by "crumpling" the layers and arranging them in a stack or pile. The layers should be oversized, for example by 50%, and then crumpled, or otherwise textured, to achieve a layer that is reduced in area and has a fairly uniform thickness. Multiple layers as such comprise a baffle which can be used inside an envelope. It is not necessary for the layers to be "random". The basic baffle materials are the same as for the other flexible baffle embodiments, however good "lay flat" characteristics, such as found in 0.5 mil polyester film, are desirable. Each baffle layer is metallized on at least one face.

FIG. 6 shows a baffle of FIG. 5 inside another form of flexible barrier envelope. The panel is shown in its expanded form. The barrier envelope is constructed out of two pieces of barrier material that are sealed around the perimeter, perimeter seals 21 of FIG. 6. The panel is assembled by expanding a baffle to the desired final thickness and adhering a top and bottom barrier material element to the baffle along lines 20 of FIG. 6. This adhering can be done by any known methods with hot melt adhesive and heat sealing the most preferred. A flat stack of baffle for this panel must therefore be longer than the intended panel length by a factor of about 1.125. The barrier material perimeter seals, element 21, can be made after the baffle has been joined to the envelope and the assembly is collapsed. The panel can be sized to fill and insulate any typical cavity by adjusting the length, width and thickness as needed. The barrier envelope area dictates the panel's final volume, hence when collapsed the barrier will extend wider than the baffle. The baffle is oversized in width to fit snugly into the cavity in order to suppress gas transfer at the edges, inside and outside the panel. For a three inch thick panel, ten to fourteen baffle layers 19 are appropriate. The baffle/barrier assembly could be made in continuous lengths and subsequently cut to the desired length. The baffle/barrier collapsed assembly can be trimmed between junction lines 20. The baffle is pushed back into the envelope and the envelope sealed. A short version of a valve or tube 1 of FIGS. 1, 6, and 12 can be included where needed. Special end cap pieces could be used to facilitate cutting panels to length in the field with the use of a sealing tool.

Panels of FIG. 6 are generally installed by first inflating the collapsed panel to the desired thickness. The panel is then stuffed into the cavity in much the same way as fiberglass. The ends of the panel of FIG. 6 require a simple folding over of the flap area to achieve the box shaped ends. The panels can be sized to fit snugly into the cavity, however installation could be aided with spray adhesives, pressure sensitive tapes, nails or staples. Nails and staples can be used through extended edge seal areas. For some applications, such as retrofitting and limited access areas such as attic peripheries, collapsed insulation panels could be inserted where needed and subsequently gas filled. The panels will expand to fill the desired cavity and can conform to irregularities. Panels can be made in many different lengths and also some odd sized "blocks" and even triangular shaped pieces. This can enable odd size and shaped building cavities to be insulated analogously to masonry work.

The baffle shape should provide substantially separate insulating gas containing chambers (or cells), but should not completely enclose those chambers. Holes on the order of 1/16 of an inch in diameter or less may be provided in the baffle structure to allow filling of the panel while at the same time minimizing convective flow within the panel. However, such holes are not necessary for flexible expansion panels, using baffle of FIG. 4 or FIG. 5, as the cavities extend through in direction "C" and the baffle cavities are open along the edge. The panels are then installed such that the sides of the panel butt snugly against the external side walls effectively closing off the cavities and eliminating any significant gas movement at the edges across the thickness of the panel. This is accomplished by making the width of the baffles slightly larger than the cavity to be insulated, for example a stud wall cavity of 14.5" width could employ a baffle around 15" wide.

The thermal performance of the insulative panel is strongly dependent on the still gas conductivity of the gas or gas mixture used in the panel. Useful low conductivity gasses which may be used in the invention are argon, carbon dioxide, sulphur hexafluoride, krypton and xenon. As a practical matter, depending on the value of wall thickness, air, argon and krypton will normally be used. Gas mixtures can easily be used to tailor the performance/cost ratio as needed.

While better performance is obtainable with lower conductivity gases such as argon and krypton, air is fairly low conductivity and has the obvious advantage that it need not be contained in the panel by a high performance barrier film. For some applications, the added value of high R-value per unit thickness is not important and air filled panels are satisfactory. Any of the baffle forms of FIGS. 4, 5, 8, 9, and 10 can be utilized with air as the gas medium amongst the baffle. Air filled embodiments can be constructed with either a simple barrier material envelope or without an envelope at all and consist simply of a core element. Simple barrier envelopes could utilize homogeneous low cost films such as polyethylene or polypropylene, which are good moisture barriers but not high performance gas barriers. Any of the panel types of this invention could be thus produced.

Panels without a barrier envelope would consist simply of a self supporting or supportive baffle/core of the types in FIGS. 4, 5, 8, 9, and 10. The baffles may be compressible, but will not be of the expansion type where the expanding barrier material locates the baffle. Attention must be given to the baffle surfaces to avoid problems with moisture and oxidation/degradation of the metallized low emissivity surfaces. For this reason "protected" low emissivity surfaces will likely be used consisting of a thin layer of polymer applied to the metallized coating. This layer will be of a substantially infrared transparent polymer such as polyethylene or polypropylene. Other protective coatings can be used as many materials if thin enough can provide enough infrared transparency yet protect the metallized surface. Such a coating will typically increase the emissivity, for example from 0.03 to 0.25. This is satisfactory, however, high performance may be achieved if all baffle surfaces have such an emissivity rather than just one per cavity. Insulation of this sort is particularly easy to install because it can be cut to size and shape just like fiberglass. Insulation of this sort will likely perform R-5/in. or better thereby being a substantial improvement over fiberglass at R-3.2/in.

For certain applications, it may be desirable to exclude oxygen from the gasses to avoid oxidation problems and decrease the gas conductivity. When such is the case, known oxygen absorbing elements whose active ingredient is iron, can be used within the panel to ensure very low concentrations of oxygen. Oxygen transmission rates through the envelope barrier materials discussed herein are the highest of the relevant gasses which would normally be used. Thus, oxygen absorbing elements can be especially beneficial in improving barrier performance.

For certain applications, it may be desirable to insure that no moisture problems exist within the panel. When such is the case, water absorbing elements, known as desiccants, can be used within the panel to insure dry conditions within the panel. Water vapor could be detrimental to the performance of some types of gas barrier materials and can accelerate degradation of metallized low emissivity surfaces on the baffle material.

To enhance flame resistance, it may be desirable to include flame retardant elements within the panel. Powder or granular forms of flame retardants, for example boric acid or other known flame suppressants, could be spread throughout the baffle. It may be desirable to use more low emissivity surfaces to avoid possible increases in effective emissivity due to the presence of the grains of flame retardant. Alternatively, baffle materials could incorporate flame retardants into their composition.

GAS FILLING ISSUES

Panels of the invention (except for air filled embodiments) require that the air be removed from the panel and the desired gas placed inside. There are basically two methods by which this can be done. The first involves use of a vacuum chamber. Baffles which are stiff or structural will require that the panels be evacuated of air in a vacuum chamber so that the panels are not damaged by atmospheric pressure. The desired gas is then fed into the panel while gas is simultaneously passed into the vacuum chamber to maintain equal pressure inside and outside the panel. The panel is then completely sealed with the desired gas inside before opening of the chamber. A suitable method of this type is described in one of the co-inventor's prior U.S. patent applications, Ser. No. 07/325,743, now allowed, the contents of which are hereby incorporated by reference, and guidance for filling panels can be obtained therein. It may be possible to conserve costly gases in structural panels by gas filling to less than atmospheric pressure.

Another suitable method for filling and sealing such panels is well known in the food packaging industry where food containers are evacuated and back-filled with nitrogen for preservation.

Another method is applicable to flexible panels which can be collapsed upon evacuation. These panels would be evacuated such that the gas volume within shrinks to practically zero and then expands again as the desired gas is filled in. The panels in each case should be filled to about atmospheric pressure.

Figure 13:
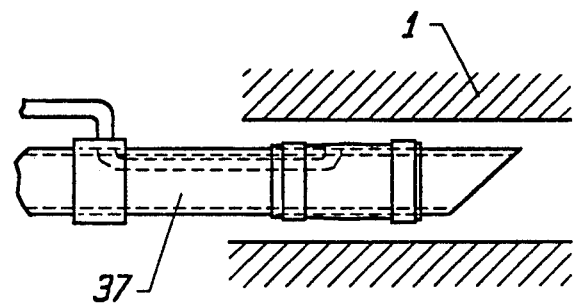
Figure 14:
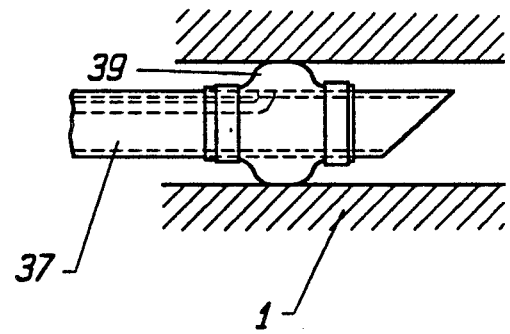

FIG. 12 shows the "valve" 1 that can be used for flexible panels. This simple tube/channel is formed from the envelope material. A possible nozzle configuration for filling the panel is shown in FIGS. 13 and 14. In FIG. 13 nozzle 37 is used to achieve a well sealed junction inside the tube. Once inserted into tube 1 of the panel, collar-bladder 39 (FIG. 14) expands to form a tight seal. Other methods can be used to achieve such a seal such as applying mechanical force to a solid seal along the nozzle in such a way that the seal expands radially, thereby forming a seal. Once filled, the channel can be sealed shut and tube 1 sealed and trimmed off. A Vertrod brand Model 4H sealer can be used for this purpose, available from Vertrod Corp. of Brooklyn, N.Y.

DETAILED DESCRIPTION OF STRUCTURAL EMBODIMENTS

Figure 7:
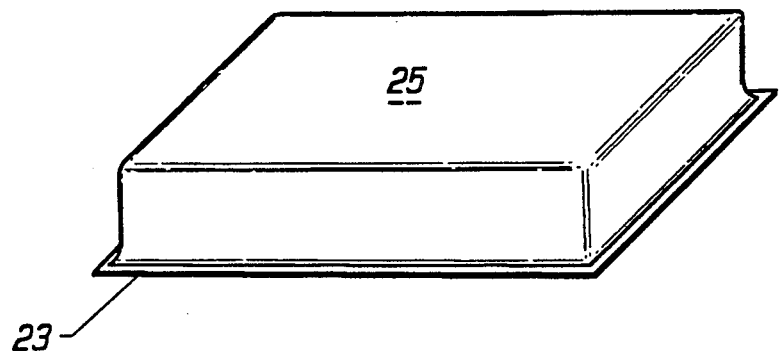
FIG. 7 is a perspective view of a structural embodiment of the invention wherein thermally formable resin are used to form the envelope of the panel.

Referring now to FIG. 7, an envelope structure which may be used in the structural embodiment of the invention is shown. The panel envelope of FIG. 7 consists of two pieces 23 and 25 (also shown in FIG. 11) which are sealed (e.g. hermetically) around the perimeter creating a flange-type seal that extends out in the plane of the panel face. Piece 25 has a box shaped depression formed into it. Since in this embodiment thermoformable materials are used, the panel envelope will be formed by heating the envelope material and molding or forming the softened film into the desired shape. The second, flat, piece 23 is sealed to the formed first piece after baffle material, and desired gas fill, has been placed inside. As before, the seal may be made using heat, RF or ultrasonic sealing.

Where very high performance, long term, thermal insulation is required, it may be desirable to form a double- envelope panel wherein a baffle, such as is shown in FIG. 4, is held within a first stiff envelope of the type shown in FIG. 7. A second stiff envelope could then be placed around the first envelope and the space between the first and second envelopes filled to a higher gas pressure with the desired low conductivity gas and sealed. This will provide a second barrier and improve the partial pressure driving forces for the primary gas enclosure.

In general, the barrier materials for structural panel envelopes will be the same as for flexible panels. Stiffer materials will be used which allows for thicker layers of barrier resin. Barrier materials will be about 5 to 20 mils thick or more. A multi-layer approach is used with a durable outer layer, a gas barrier middle layer and a sealable second outer layer (facing inside the panel).

Figure 8:
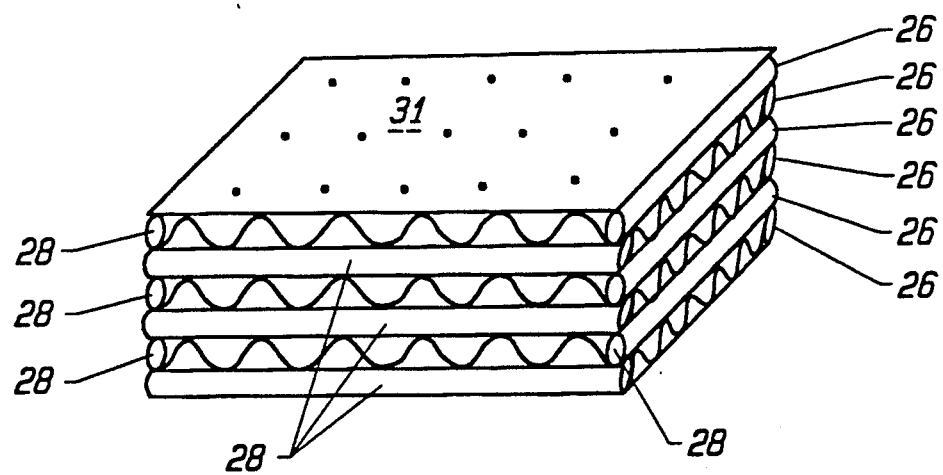
FIGS. 8-10 are perspective views of alternative structural baffle embodiments of the invention.
Figure 9:
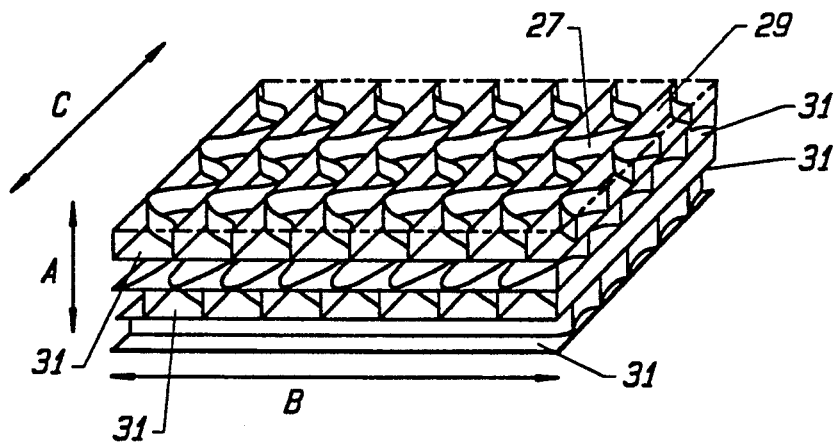
Figure 10:
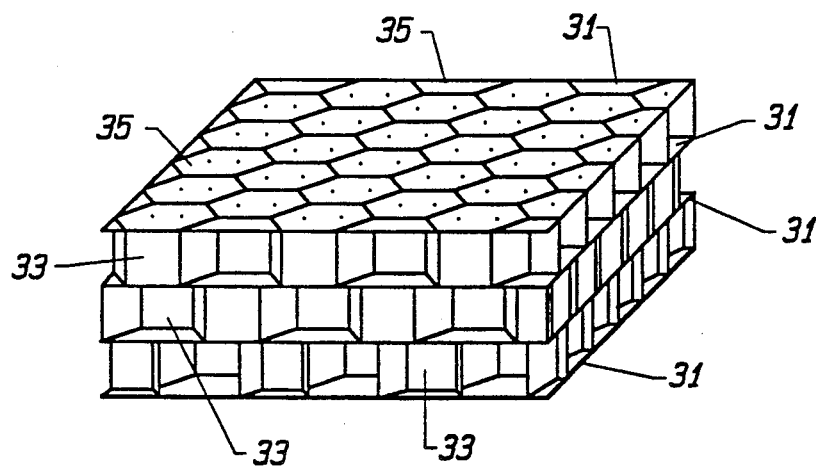

FIGS. 8, 9 and 10 show typical baffles which may be used in structural embodiments of the invention. The strength of the baffle is achieved by using multiple layers of baffle materials oriented as shown in FIGS. 8–10 such that a force applied to the face of the baffle is supported.

FIG. 8 shows a layered structural baffle wherein cross members 26 are shaped to define gas containing chambers separated by separator sheets 31. Alternating layers of cross members 26 are oriented at 90 degrees to one another to create support and lengthen the solid conductive paths across the panel. Rolled edges 28 can be used to create greater strength and thermal performance at the edges of the baffle from layer to layer. This type of structural baffle is generally referred to as alternating corrugations. It is understood that while roughly sinusoidal corrugations are depicted, other types such as "V" and "square wave" can also be used.

The materials used in forming a baffle of FIG. 8 are preferably materials such as polyester, polyvinylchloride, polyethylene, polypropylene and polystyrene all from 1.5 to 15 mils in thickness. Recycled and/or virgin resins can be used. Alternatively, kraft paper or board stock of thickness 3 to 20 mils may be used. The exact gauge and type of material can be tailored to satisfy the structural requirements of the intended application. Low emissivity surfaces will be applied to the materials by either direct metallizing or laminating of a thin metallized film to the materials. Metallizing provides a low emissivity surface by depositing a thin layer of aluminum, 200 to 1000 angstroms thick. In general the baffles will be constructed out of roll stock materials which have a metallized surface on one face. Preferably, materials which are partially infrared transparent, such as polypropylene and polyethylene, are used to enhance the effectiveness of the baffle surfaces which are not metallized.

The baffle of FIG. 8 will generally be assembled by stacking together separate layers consisting of one cross member 26 and one separator sheet 31. These elements can be made in continuous fashion and subsequently divided into separate layers to be stacked together to create the baffle of FIG. 8. The continuous layer element could be produced by assembling roll stock materials with metallized surfaces by known adhering methods. An alternative method to produce the material is to extrude a continuous layer with the desired section, consisting of cross member 26 and separator sheet 31. This sheet could then be metallized (or a metallized film laminated) on the flat face (separator sheet 31). Such continuous corrugated layers are routinely produced as "plastic cardboard", where corrugated plastic is used to replace corrugated cardboard in reusable containers.

In FIG. 9, another possible baffle design is shown wherein curved cross members 27 and straight cross members 29 are positioned in staggered layers across the panel (direction "A"). In adjacent layers cross members 27 and 29 are oriented such that their widest portions are oriented along direction "A", i.e. normal to the plane of the panel faces. This provides the ability to support weight placed on the face of the panel while at the same time creating gas chambers or cells which, as with the flexible baffle embodiments, can be sized to minimize convective heat transfer. Alternate layers can be oriented at 90 degrees to one another to provide better structural support and to interrupt and/or lengthen solid conductive paths.

In directions "B" and "C" of FIG. 9 the panel may be sized as necessary to fit the desired application. In direction A, the face to face panel thickness will also depend on the application, as well as the gas used and the desired insulation performance. Typically, as with the flexible baffles, individual layers will be from $\frac{1}{8}$" to $\frac{1}{2}$" in direction "A". Cell sizes in direction "B" or "C" would likewise measure no more than three inches.

Separator sheets 31 are used to separate the layers in direction "A" and on the top and bottom of the baffle, adjacent the inside of the envelope faces though the top sheet is not shown in this view. Sheets 31 will be perforated, holes less than 1/16", such that no closed cells are created. At least one surface of sheets 31 will be surfaced with a low emissivity coating to reflect infrared radiation.

The embodiment of FIG. 10 is like that of FIG. 9 in all respects, except that individual layers are formed of a material 33 in a honeycomb shape. The honeycombs are oriented so that the thickest wall of material 33 is again oriented in direction "A" to provide structural support. A top layer sheet 31 is also shown. This layer includes holes 35 for allowing gas to pass into the cells within the baffle. Adjacent layers are shifted to lengthen solid conduction paths.

The materials forming cross members 27 and 29 of FIG. 9 and the structural honeycomb 33 of FIG. 10 are preferably kraft paper or board stock. Other materials such as polyester, polyvinylchloride, polyethylene, polypropylene and polystyrene, all from 1.5 to 12.0 mils in thickness can be used. Composite materials such as resin impregnated aramid fibers and other non-metal materials typical of honeycomb structures can also be used. These vertical elements need not have low emissivity surfaces but should be low thermal conductivity. Materials useful for honeycomb baffles are available from Honeycomb Products Inc. La Mirada, Calif. The materials forming the separator sheets 31 (or honeycomb facing) will typically be a different material than the vertical supporting elements 27, 29, and 33. The facing material should be arranged such that one low emissivity surface is exposed to each gas cavity in the baffle. The materials for the separator sheets 31 (facing) are the same as those discussed above for the baffle of FIG. 8.

Figure 11:
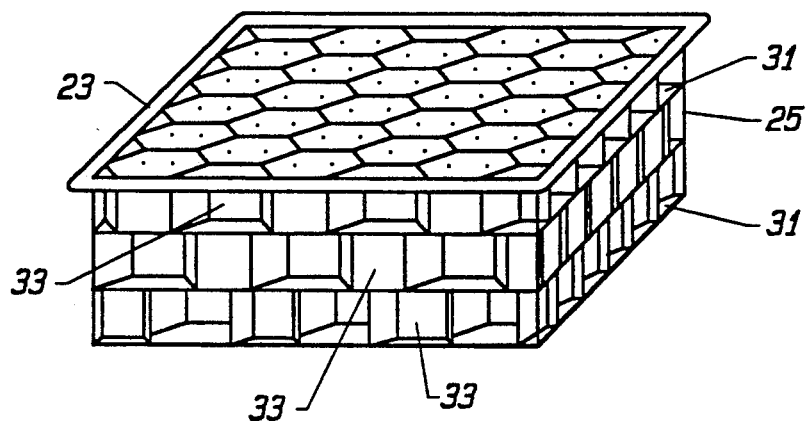
FIG. 11 is a perspective view showing the baffle of FIG. 10 within a transparent envelope of the type shown in FIG. 7.

Any of the embodiments described may be made in a form translucent to visible light. Such embodiments are useful for daylighting and passive solar installations. In these applications, as shown in FIG. 11, the baffle material will be comprised of polymer films having a coating transparent to visible light but which is reflective in the infrared spectrum. The baffle and envelope materials should transmit no less than 50% of visible light and have an infrared emissivity less than 0.3. The overall panels will be from 5 to 50% transparent to visible light. As before, the substrates for such a coating would be polyethylene, polyester or polypropylene coated with a thin metal layer (i.e. 50 to 1000 angstroms). Metals useful include aluminum, copper, silver and gold. It is possible to use an opaque baffle material 33 with a visible light transmitting material for the envelope.

While the above description contains many specifics, these should not be construed as limitations on the scope of the invention, but rather as examples of the preferred embodiments. Many other variations are possible. For example (1), baffles could be produced by forming cells/cavities of most any conceivable pattern into stiff metallized sheet (deep embossing). These layers could then be stacked to form a baffle and then enveloped. Or for example (2), baffles could be constructed using a largely infrared transparent open celled "foam" type material between low emissivity layers. The open celled structure would provide structure or support to the low emissivity layers and is gas fillable. Or for example (3), combination approaches using flexible baffle elements, such as "crumpled" layers, could be used within structural baffles to increase performance and enable larger scale structural elements. Or for example (4), flexible baffle forms could be made as structural panels.

EXAMPLES

Samples were sent to Oak Ridge National Laboratory (ORNL) for independent testing. The specimens tested were of the "crumpled", or random, baffle layer assembly. Testing was performed on their R-matic apparatus which is designed to meet the standard as set in ASTM C518, configuration B (two transducers, both faces), i.e., ASTM Standard, Designation C518-85, "Standard Test Method for Steady-State Heat Flux Measurements and Thermal Transmission Properties by Means of the Heat Flow Meter Apparatus", Annual Book of ASTM Standards, Vol 04.06.

The specimens tested at ORNL were intended to demonstrate the general gas filled panel (GFP) approach. The 16" by 16" by 1" specimens were encased in a rigid styrene foam bivalve for a total test thickness of two inches. "Blank" styrene was also measured at ORNL and the effect of the mask was backed out by ORNL to arrive at the final results. The GFPs were constructed with one primary barrier comprised of two films sealed around the perimeter. The inside was split into two cavities by a heat sealed layer which served to limit mass transfer but was not hermetically sealed. Each cavity was filled with a baffle pile that consisted of three layers of 13 micron (0.5 mil) two sided metallized polyester film and two layers of "clear" 13 micron (0.5 mil) polyester film. The clear film was oversized 60×60 cm (24"×24") and crumpled up in an even but random fashion to create alternating clear and metallized layers. This produced a panel with eleven layers in one inch and with an average cavity size of less than 2.5 mm (0.1"). It is difficult to exactly quantify cavity scale due to the nature of the "crumpling." The intent with these panels was to effectively eliminate convective and radiative heat transfer. Except for the use of ultra thin films, solid conduction minimizing was not attempted.

Results from ORNL are summarized in Table 1 and indicate prototype performance levels close to predicted levels. The tests found that the difference between heat flow up and heat flow down was less than 1%; this is within the 2% reproducibility of the R-matic. This finding indicates that the contribution of convection to heat transfer has been effectively eliminated. The differences between measured and projected R-values for the argon and krypton GFPs is primarily attributed to solid conduction through the large numbers of baffle layers. In addition, decreased performance may be attributed to fill concentrations less than 100%. However, oxygen concentration measurements (a crude measurement of gas fill) indicate that fill concentrations are better than 98%.

TABLE 1

Measured R-values from the ORNL R-Matic and Projected R-values in m-K/W (hr-ft²-F/Btu-in)

|  | ORNL Measured | Projected |
|---|---|---|
| Air GFP | 36.1 (5.2) | 38 (5.5) |
| Argon GFP | 49.3 (7.1) | 55 (8) |
| Krypton GFP | 86.7 (12.5) | 105 (15) |

Samples of the preferred embodiments of this invention were constructed and tested at Lawrence Berkeley Laboratory (LBL) using an infrared thermography system. IR imaging provides a representation of surface temperatures which can be used to infer thermal performance. Panels were analyzed by side-by-side comparison of their performance to that of a recognized insulator of the same thickness under the same temperature conditions. The infrared thermography system was used to measure the average warm side surface temperatures of test specimens, consisting of the prototype panels set into rigid foam. Two examples of panels tested and the performance indications are given below.

A baffle structure, as in FIG. 8, was constructed and its performance compared to that of polystyrene rigid foam (Dow Styrofoam). The baffle was air filled and its thickness was 2", the same as the foam. The baffle was constructed entirely out of 2.0 mil thick polyester film (Mylar) metallized on both sides. Seven equal corrugated layers were used in the same configuration as FIG. 8. The pitch of the corrugations was 1.6". The baffle was set directly into a 8" by 8" section removed from the foam board. This test specimen was placed on a cold chamber to generate a temperature difference of 62.4 degrees F. The warm side average surface temperatures of both the baffle section and the styrene foam section were measured at the same time under the same conditions. The baffle section was 0.2 F. warmer than the styrene section, positively indicating better thermal performance on the part of the air filled baffle. An R-value can be calculated based on the measured surface temperatures in combination with the inside and ambient air temperatures and the R-value of the recognized insulator. This calculation yields R-5.4/in for the air filled baffle based on the recognized R-5.0/in. for the styrene foam. These test results indicate that a air filled baffle can perform closer to ideal still gas performance, than can the air filled closed cell foam structure of styrene foam.

A similar test was performed on an argon filled expansion panel. This panel consisted of the baffle structure of FIG. 4 enclosed in a barrier envelope and filled with argon gas. The panel was maintained at 3.25" thick and set into a CFC blown polyiso-cyanuarate rigid foam board also 3.25" thick. The panel baffle was constructed out of 0.0007" metallized biaxially oriented polypropylene. The baffle (of FIG. 4c) was twelve layers with the slanted elements spaced one inch apart. The barrier envelope was constructed as in FIG. 2 out of a coextruded film 4 mils thick having the basic structure nylon/tie/EVOH/tie/LDPE. The test section was tested in the same fashion as discussed above. The surface temperatures of the argon gas filled panel and the CFC foam sections were equal, indicating equal thermal performance at a recognized R-7.2/in.

We claim:

1. A lightweight, highly insulative panel comprising a gas envelope enclosing an expandable and flexible baffle means, wherein;
    A. said gas envelope means comprises a single, folded sheet or a two sheet polymeric film joined at the edge and having first and second gas envelope faces; and
    B. said baffle means comprising a shaped thin sheet core material having at least one surface with an infrared reflective coating that imparts an infrared emissivity of about 0.3 or less and providing
        1. separate gas containing chambers with an average thickness of about ⅛ to ½ inches measured approximately normal to said gas envelope faces, and no more than five inches in one direction parallel to said gas envelope faces, and whereby said chambers restrict the flow of gas between adjacent chambers during operation but allow for forces exchanges of the gas within said chambers during manufacture or installation; and
        2. a configuration of said core material such that core materials having extension in the direction normal to said envelope faces are assembled such that adjacent layers in the direction normal to said envelope faces of gas chambers are staggered or angled with respect to the direction normal to said envelope faces, such that the majority of paths through the core material have lengths that are longer that the shortest dimension distance between said faces.

2. A highly insulative panel as in claim 1 wherein said baffle means comprises multiple sheets of said core material stacked in a layered fashion and connected to one another along lines approximately parallel to one another and in planes approximately parallel to the planes defined by said envelope faces, and said lines extend across the width of said sheets, where the width is oriented in the horizontal direction of the panel as oriented in use, and said lines are staggered from layer to layer, so as to form said gas containing chambers when said sheets move apart with the introduction of gas into said envelope such that said layers of said baffle means are self locating.

3. A highly insulative panel as in claim 1 wherein said baffle means comprises said sheet core material which is stiff, forming said baffle which is supportive, and said baffle is configured such that, for each layer of said chambers, a support layer of said core material comprises strips of material which are connected to one another along their length and are oriented with some extension in the direction normal to said envelope faces and are connected along the edges of said strips to a separator sheet oriented largely parallel to said envelope faces, and wherein said chambers are no more than three inches in at least one direction measured parallel to the plane of said first envelope face.

4. A highly insulative panel as in claim 2 wherein said baffle is shaped and assembled to said envelope to allow said baffle to expand between said envelope faces in a self locating manner when gas is introduced into said envelope such that the panel length remains largely the same and such that said baffle remains connected to the inside surface of said envelope face.

5. A highly insulative panel as in claim 2 wherein said baffle means and said gas envelope means are formed from flexible material and said panel can be evacuated of gas to acquire a collapsed state, and can be rolled or folded as is convenient for transportation and storage.

6. A highly insulative panel as in claim 1 wherein said gas envelope is filled with gas of relatively low thermal conductivity with respect to air.

7. A highly insulative panel as in claim 2 wherein said gas envelope is filled with a relatively low thermal conductivity gas and has a corresponding thermal performance at an average temperature of 32 degrees Fahrenheit, of a maximum level determined by the ideal still gas conductivity of said gas and a minimum thermal performance determined from the relational group consisting of air at R-5.2 hr-ft$^2$-°F./Btu-in, argon at R-7.1 hr-ft$^2$-°F./Btu-in, krypton at R-11.5 hr-ft$^2$-°F./Btu-in, sulfer-hexaflouride at R-8.3 hr-ft$^2$-°F./Btu-in, carbon dioxide at R-7.7 hr-ft$^2$-°F/Btu-in, xenon at R-16 hr-ft$^2$-°F./Btu-in, and mixtures of these gases at linearly corresponding performance levels.

8. A highly insulative panel as in claim 3 wherein said gas envelope is filled with a relatively low thermal conductivity gas and has a corresponding thermal performance at an average temperature of 32 degrees Fahrenheit, of a maximum determined by the ideal still gas conductivity of said gas and a minimum thermal performance determined from the relational group consisting of air at R-4.2 hr-ft$^2$-°F./Btu-in, argon at R-6.1 hr-ft$^2$-°F./Btu-in, krypton at R-9.5 hr-ft$^2$-°F./Btu-in, sulfer-hexaflouride at R-7.1 hr-ft$^2$-°F./Btu-in, carbon dioxide at R-6.4 hr-ft$^2$-°F./Btu-in, xenon at R-14 hr-ft$^2$-°F./Btu-in, and mixtures of these gases at linearly corresponding performance levels.

9. A highly insulative panel as in claim 1 wherein said polymeric film is multi-layered and comprises first and second outer principal layers of polymeric film connected to a third principal inner layer of low gas permeability material and wherein said first layer is puncture and tear resistant and said second outer layer is hermetically sealable.

10. A highly insulative panel as in claim 9 wherein said first outer principal layer is selected from the group consisting of nylon, polyester, polypropylene, and polyethylene and wherein said second outer principal layer is selected from the group polyethylene, ionomer, and polypropylene and wherein said third principal inner layer is selected from the group consisting of ethylene vinyl alcohol, acrylonitrile copolymers, polyvinyl alcohol, metallized coatings, silicon oxide coatings and vinylidenechloride based polymers.

11. A highly insulative panel as in claim 1 wherein said polymeric film is multi-layered and comprises a layer of low gas permeability material selected from the group consisting of ethylene vinyl alcohol, acrylonitrile copolymers, polyvinyl alcohol, metallized coatings, silicon oxide coatings and vinylidenechloride based polymers.

12. A highly insulative panel as in claim 1 wherein said polymeric film is substantially moisture impermeable and has an oxygen transmission rate of about 0.02 cc/100in$^2$-24 hrs-atm or less.

13. A highly insulative panel as in claim 1 wherein said core material is selected from the group consisting of polyethylene, polyester, polypropylene, and wood and fiberglass papers, and a portion of said core material has a layer on at least one surface of said core material of a coating material that imparts an infrared emissivity of 0.3 or less to said core material surface.

14. A highly insulative panel as in claim 13 wherein said coating material is from the group consisting of aluminum, copper, tin, gold and silver, and has a thickness of from 50 to 1000 angstroms and an infrared emissivity of 0.3 or less.

15. A highly insulating panel as in claim 13 wherein said layer of said coating material is applied in such a manner that said core material is capable of transmitting more than 40% and less than 90% of light in the visible and solar spectrum, and said polymeric envelope film comprises transparent polymers capable of transmitting light.

16. A highly insulative panel as in claim 3 wherein the density of the panel is 4.0 lb/ft$^3$ or less.

17. A highly insulative panel as in claim 2 wherein said panel has a density of less than 1.5 lb/ft$^3$.

18. A highly insulative panel as in claim 1 wherein more than 5% of the visible light striking said panel is transmitted through the panel.

19. A lightweight highly insulative panel comprising a baffle means wherein, said baffle means comprises a shaped thin sheet material having at least one surface with an infrared reflective coating that imparts an infrared emissivity of about 0.3 or less and said material being constructed into an assemblage having first and second outer faces and a volume between faces which is largely filled with gas and provides, A. separate gas-containing chambers with an average thickness of about ⅛ to ½ inches measured approximately normal to said outer face, and no more than five inches in one direction parallel to said gas envelope faces, and whereby said chambers restrict the flow of gas between adjacent chambers during operation and B. a configuration of said core material such that core materials having extension in the direction normal to said envelope faces are assembled such that adjacent layers in the direction normal to said envelope faces of gas chambers are staggered or angled with respect to the direction normal to said envelope faces, such that the majority of paths through the core material from said first to said second outer faces have lengths that are longer than the distance between said faces.

20. A highly insulative panel as in claim 19 wherein said baffle means comprises said sheet core material which is stiff, forming said baffle which is supportive, and said baffle is configured such that, for each layer of said chambers, a support layer of said core material comprises strips of material which are connected to one another along their length and are oriented with some extension in the direction normal to said envelope faces and are connected along the edges of said strips to a separator sheet oriented largely parallel to said envelope faces, and wherein said chambers are no more than three inches in at least one direction measured parallel to the plane of said first outer face.

21. A highly insulative panel as in claim 19 wherein said baffle means comprises said sheet core material which is flexible, forming said baffle which is self supporting and compressible and said baffle is configured such that, for each layer of said chambers a support layer of said core material comprises a sheet of material which is shaped to contain a repeating feature which provides said support layer with extension in the direction normal to said outer faces, such that the feature exists in a first plane perpendicular to the outer faces and said feature is extended continuously in a second direction parallel to the outer faces and perpendicular to the first plane, and said support layer is connected, in said second direction, to a separator sheet, oriented largely parallel to said outer faces, at locations of maximum extension of said support layer in the directions perpendicular to said outer faces, and wherein said feature has a scale which is less than three inches in the direction parallel to said outer faces and to said first plane.

22. A highly insulative panel as in claim 19 wherein said core material is selected from the group consisting of polyethylene, polyester, polypropylene, and wood and fiberglass papers, and at least a portion of said core material has a layer on at least one surface of said core material of a coating material that imparts an infrared emissivity of 0.3 or less to said core material surface.

23. A highly insulative panel as in claim 22 wherein said coating material is from the group consisting of aluminum, copper, tin, zinc, nickel, steel, gold and silver, and has a thickness of from 50 to 1000 angstroms and an infrared emissivity of 0.3 or less.

24. A highly insulative panel as in claim 22 wherein said coating material is covered by a protective layer of material that is transparent to infrared light and is from the group consisting of polyethylene and polypropylene.

25. A highly insulating panel as in claim 22 wherein said layer of said coating material is applied in such a manner that said core material is capable of transmitting more than 40% and less than 90% of light in the visible and solar spectrum, and wherein more than 5% of the visible light striking said panel is transmitted through the panel.

* * * * *